US006308248B1

(12) United States Patent
Welker et al.

(10) Patent No.: US 6,308,248 B1
(45) Date of Patent: *Oct. 23, 2001

(54) METHOD AND SYSTEM FOR ALLOCATING MEMORY SPACE USING MAPPING CONTROLLER, PAGE TABLE AND FRAME NUMBERS

(75) Inventors: Mark W. Welker; Michael P. Moriarty, both of Spring; Thomas J. Bonola, Tomball, all of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,781

(22) Filed: Dec. 31, 1996

(51) Int. Cl.$^7$ .................................................. G06F 12/02
(52) U.S. Cl. .......................... 711/209; 709/104; 711/153; 711/170; 711/202; 713/1
(58) Field of Search .................................... 345/515, 516, 345/512; 711/208, 202, 206, 207, 209, 100, 101, 104, 167, 153, 170, 173; 712/214; 709/104; 713/1

(56) References Cited

U.S. PATENT DOCUMENTS

| | | | |
|---|---|---|---|
| 3,913,070 | * 10/1975 | Malcolm et al. | 709/104 |
| 4,197,579 | * 4/1980 | Otis, Jr. et al. | 712/214 |
| 5,113,180 | * 5/1992 | Gupta et al. | 345/515 |
| 5,129,060 | * 7/1992 | Pfeiffer et al. | 345/516 |
| 5,159,678 | * 10/1992 | Wengelski et al. | 711/153 |
| 5,640,332 | * 6/1997 | Baker et al. | 345/197 |
| 5,802,605 | * 9/1998 | Alpert et al. | 711/208 |
| 5,854,638 | * 12/1998 | Tung | 345/512 |
| 5,907,863 | * 5/1999 | Bolyn | 711/167 |
| 5,920,898 | * 7/1999 | Bolyn et al. | 711/167 |

OTHER PUBLICATIONS

Video Electronics Standards Association, "VESA Unified Memory Architecture (VUMA) Standard Hardware Specification, Version 1.0", San Jose, CA, pp. 1–45 (Mar. 8, 1996).
Video Electronics Standards Association, "VESA Unified Memory Architecture (VUMA) Standard BIOS Extension Specification, Version 1.0", San Jose, CA, pp. 1–24 (Mar. 8, 1996).
Alliance Semiconductor Corporation, "An Analysis of Unified Memory Architecture", San Jose, CA, pp. 1–6 (1995).
Rambus, Inc., "Rambus Layout Guide", 1–34, A–1 to A–6, B–1 to B–10 (1996).
Rambus, Inc., "Rambus Memory: Multi–Gigabytes/Second And Minimum System Cost", pp. 1–4 (date unknown).

(List continued on next page.)

Primary Examiner—B. James Peikari
(74) Attorney, Agent, or Firm—Sharp, Comfort & Merrett, P.C.

(57) ABSTRACT

A method and apparatus of allocating memory space in a main memory of a computer system to a unified memory architecture device. The main memory is associated with a physical address space. A required linear address range is determined for the video card, and the linear address range is mapped to scattered portions in the physical address space. A page table is created containing page frame numbers corresponding to page frames in the main memory, the page frames being allocated to the device. The page frames are non-contiguous blocks of the main memory. The device is associated with a linear address space. The frame numbers are loaded into a translation look-aside buffer (TLB) for converting a linear address in the linear address space to a physical address in the physical address space.

24 Claims, 8 Drawing Sheets

OTHER PUBLICATIONS

Rambus, Inc., "Rambus and UMA: The Win/Lose Debate", pp. 1–2 (date unknown).

Rambus, Inc., "Memory Latency Comparison", Moutain View, CA, pp. 1–8 (Sep. 6, 1996).

Rambus, Inc., "3D Graphics Memory Architecture Comparison", pp. 1–4 (date unknown).

Rambus, Inc., "Comparison RDRAM and SGRAM for 3D Applications", Mountain View, CA, pp. 1–16 (Oct. 29, 1996).

Rambus, Inc., "Rambus Memory: Enabling Technology for PC Graphics", Mountain View, CA, pp. 1–16 (Oct. 1994).

* cited by examiner

METHOD AND SYSTEM FOR ALLOCATING MEMORY SPACE USING MAPPING CONTROLLER, PAGE TABLE AND FRAME NUMBERS

BACKGROUND OF THE INVENTION

The invention relates to memory management in a computer system.

A computer system includes a main memory (typically implemented with dynamic random access memories or DRAMs) used to store code and data information. Generally, a computer system includes several layers of buses, including a host bus, a Peripheral Component Interconnect (PCI) bus, and an expansion bus such as the Industry Standard Architecture (ISA) or Extended Industry Standard Architecture (EISA) bus. The main memory is used as a common resource accessible to system devices on the buses. Typically, the main memory is located on the host bus along with the central processing unit (CPU) for optimal performance of the computer system because the CPU requires fast access to the main memory.

Certain other system devices may also require relatively fast access to a memory device. One such system device is the video card, which typically includes a video memory (or frame buffer) for storing video data. Local storage of the video data allows a video controller in the video card to refresh or update a video display within the required amount of time to avoid flickering problems.

To avoid the need for a dedicated frame buffer on the video card, the VESA (Video Electronics Standards Association) Unified Memory Architecture (VUMA) was developed, which is described in "VESA Unified Memory Architecture (VUMA) Standard Hardware Specifications," Version 1.0 (Mar. 8, 1996), and which is hereby incorporated by reference. VUMA is a computer system memory architecture in which the main memory is "physically" shared between the system (including the CPU and other devices) and a peripheral device (a "VUMA device"). Typically, a system device other than the CPU accesses the main memory through a direct memory access (DMA) controller over the ISA or EISA expansion bus, and a PCI bus device accesses the main memory in a memory transaction over the PCI bus. A VUMA device, on the other hand, is directly coupled to the main memory bus, as is the CPU, which improves memory access times for the VUMA device. One such VUMA device is a video card.

Referring to FIG. 1, a VUMA device 18 is connected to a Peripheral Component Interconnect (PCI) bus 12 in a computer system. The VUMA device 18 is also connected to a main memory 16 (having a storage capacity of, for example, 8 megabytes) over a memory bus 20, which is further connected to a core logic circuit 14 (including a bridge to the PCI bus 12 and a memory controller). The core logic circuit 14 acts as the interface between a CPU 10 and the PCI bus 12 and the main memory 16. Other devices (not shown) are also connected to the PCI bus 12.

The main memory 16 is shared between the system (including the CPU 10 and other PCI bus devices) and the VUMA device 18, which can directly access the main memory 16 over the memory bus 20. A portion 22 of the main memory 16 is allocated as the memory for the VUMA device 18 ("the VUMA memory"), and the remainder of the main memory 16 is allocated to the rest of the computer system.

The VUMA memory 22 is mapped to the top of the main memory 16 as a single, contiguous region. Thus, for example, if the VUMA device 18 requires 2 megabytes (MB) of memory space, a 2-MB contiguous region of the main memory 16 is mapped to the VUMA memory 22, leaving the remaining 6-MB region for system use.

SUMMARY OF THE INVENTION

In general, in one aspect, the invention features a method of allocating memory space in a main memory of a computer system to a unified memory architecture device. The main memory is associated with a physical address space. A required linear address range is determined for the device, and the linear address range is mapped to scattered portions in the physical address space.

Implementations of the invention may include one or more of the following features. A page table is created containing page frame numbers corresponding to page frames in the main memory, the page frames being allocated to the device. The page frames are in non-contiguous blocks of the main memory. The frame numbers are loaded into a translation look-aside buffer for converting a linear address in the linear address space to a physical address in the physical address space. The device includes a video card.

In general, in another aspect, the invention features a method of storing video data of a video card in a main memory of a computer system. Non-adjacent portions of the main memory are allocated, and the allocated portions are used to store the video data.

Implementations of the invention may include one or more of the following features. A page table is created containing page frame numbers corresponding to page frames in the main memory, the page frames being allocated to the video card. The page frames are in non-contiguous blocks of the main memory. The video card is associated with a linear address space. The frame numbers are loaded into a translation look-aside buffer for converting a linear address in the linear address space to a physical address in the physical address space.

In general, in another aspect, the invention features a method of mapping a linear address of a unified memory architecture device to a physical address in a main memory in a computer system. Page frame numbers are stored in map registers, wherein the page frame numbers correspond to non-adjacent page frames in the main memory. One of the map registers is accessed with the linear address to retrieve a portion of the physical address.

In general, in another aspect, the invention features a computer system including a main memory having a physical address space. A device is coupled to the main memory and allocated a linear address space. A controller is adapted to map the linear address space of the device to scattered portions in the physical address space.

Implementations of the invention may include one or more of the following features. A page table accessible by the controller contains page frame numbers representing page frames in the main memory allocated to the device. The page frames are in non-contiguous blocks of the main memory. The device includes a translation look-aside buffer. The controller is adapted to load the frame numbers of the page table into the translation look-aside buffer for converting a linear address to a physical address. The device includes a video card. The device is allocated to multiple regions in the main memory, the multiple regions being accessible by the device. Multiple page tables are accessible by the controller, with each page table containing page frame numbers representing page frames in the main memory corresponding to an allocated region.

Implementations of the invention may include one or more of the following advantages. Memory space in a main memory allocated to a computer system device can be scattered throughout the main memory without the need to allocate a contiguous region of the memory. Main memory space can be more effectively utilized by avoiding the requirement of allocating a contiguous portion of the main memory for any one particular device. By scattering the memory allocated to the device in multiple banks of the main memory, concurrent access to the different memory banks by the device and by other system devices is enabled.

Other advantages and features will be apparent from the following description and claims.

DETAILED DESCRIPTION OF THE INVENTION

Figure 1:
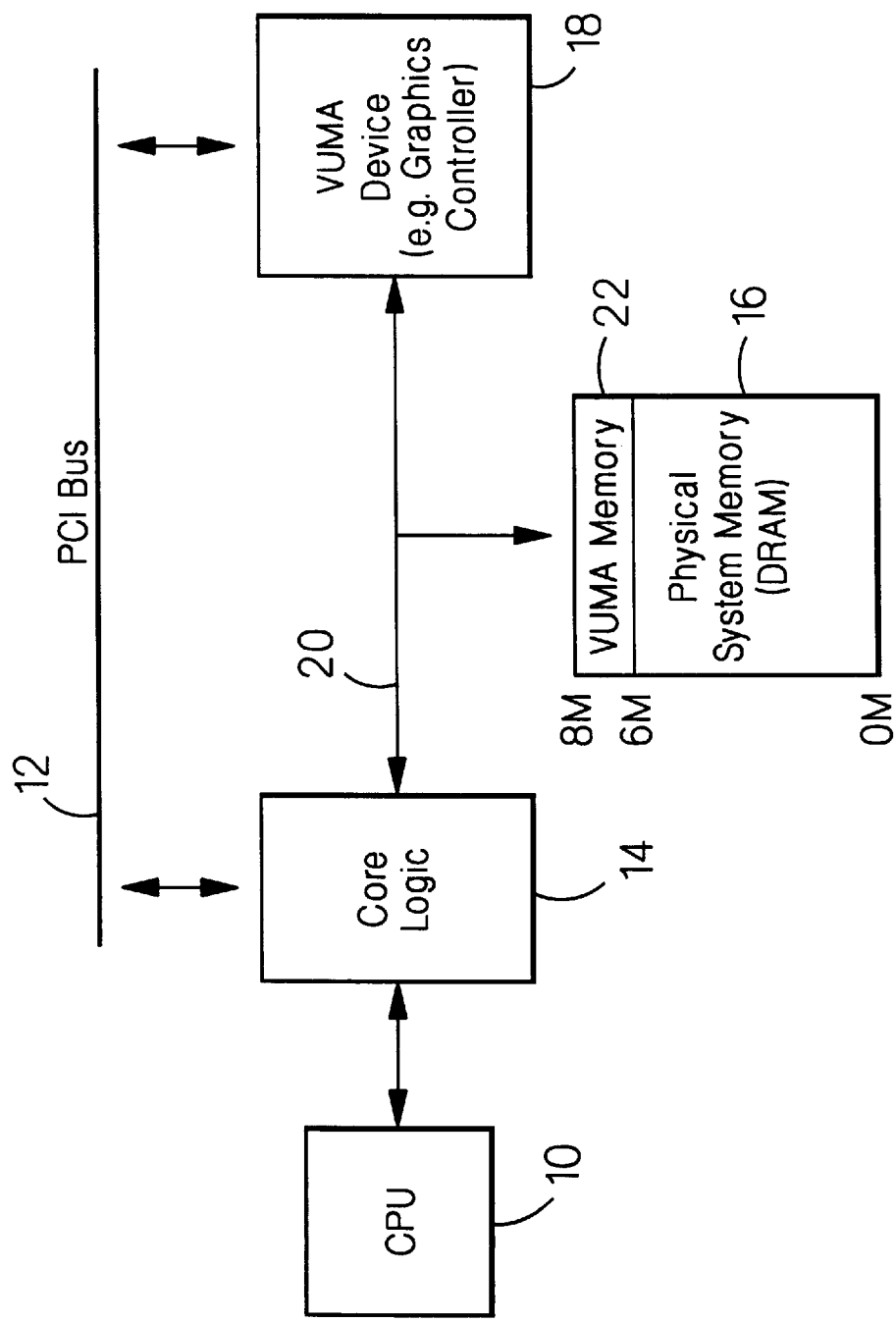
FIG. 1 is a block diagram of a portion of a computer system.
Figure 2:
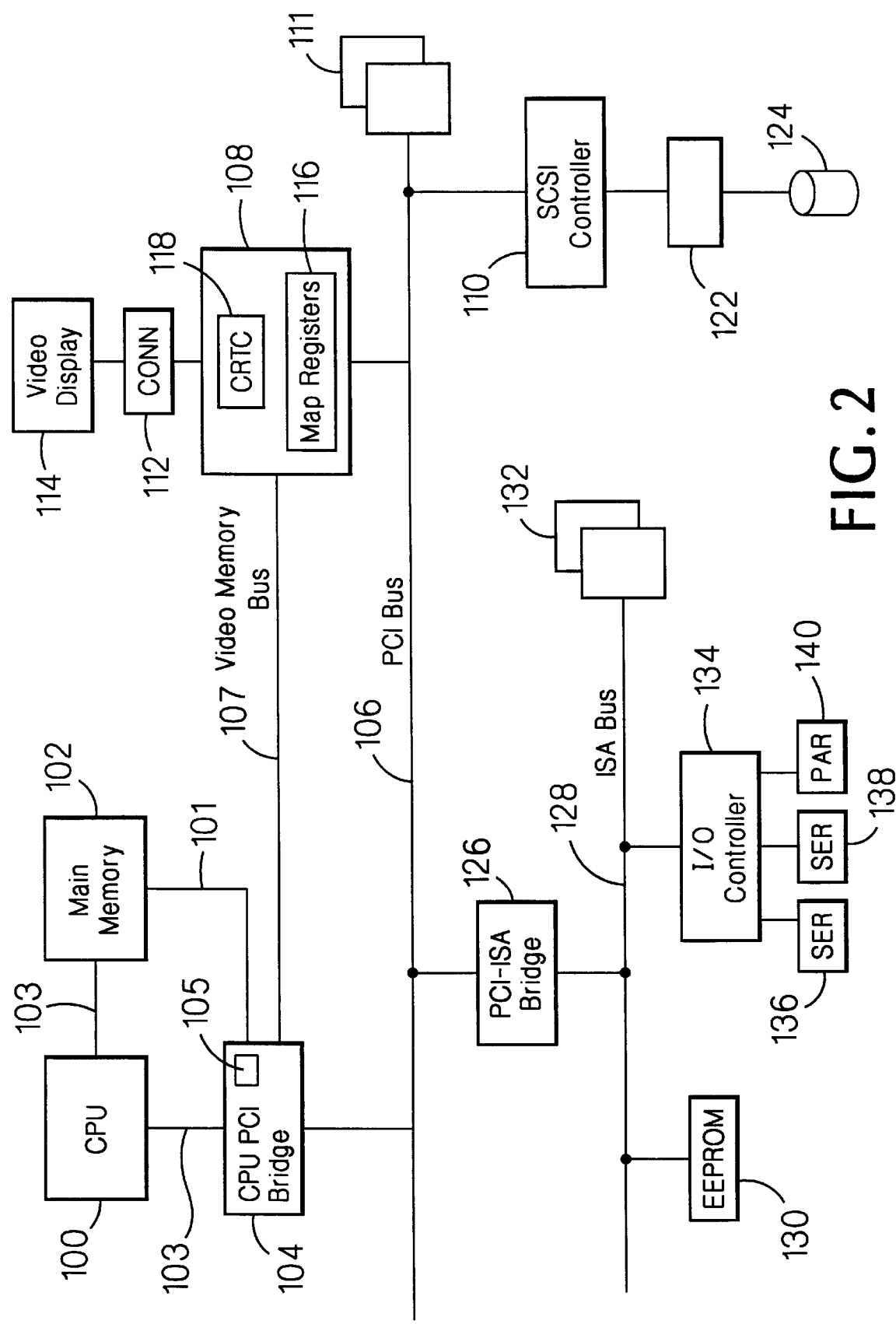
FIG. 2 is a block diagram of a computer system in which the main memory is shared between a video card and the rest of the system.

Referring to FIG. 2, a computer system includes a central processing unit (CPU) 100, such as the Pentium Pro processor, and a main memory 102. The main memory 102 can be implemented with a high bandwidth multi-channel memory architecture, such as Rambus dynamic random access memories (RDRAMs) arranged in multiple RDRAM channels 1–3. The main memory 102 can have a combined total storage capacity of 16 megabytes (MB), for example. Each RDRAM channel is accessible by the CPU 100, a video card 108, or a device on a Peripheral Component Interconnect (PCI) bus 106.

The computer system implements the VESA Unified Memory Architecture (VUMA) in which the video card 108 is the VUMA device. Access to the main memory 102 is controlled by a memory controller 105 in a CPU-PCI bridge 104 connected to the PCI bus 106. Requests for the main memory 102 to the memory controller 105 can come over a host bus 103 (from the CPU 100), a video memory bus 107 (from the video card 108), or the PCI bus 106 (from PCI bus masters).

Figure 3:
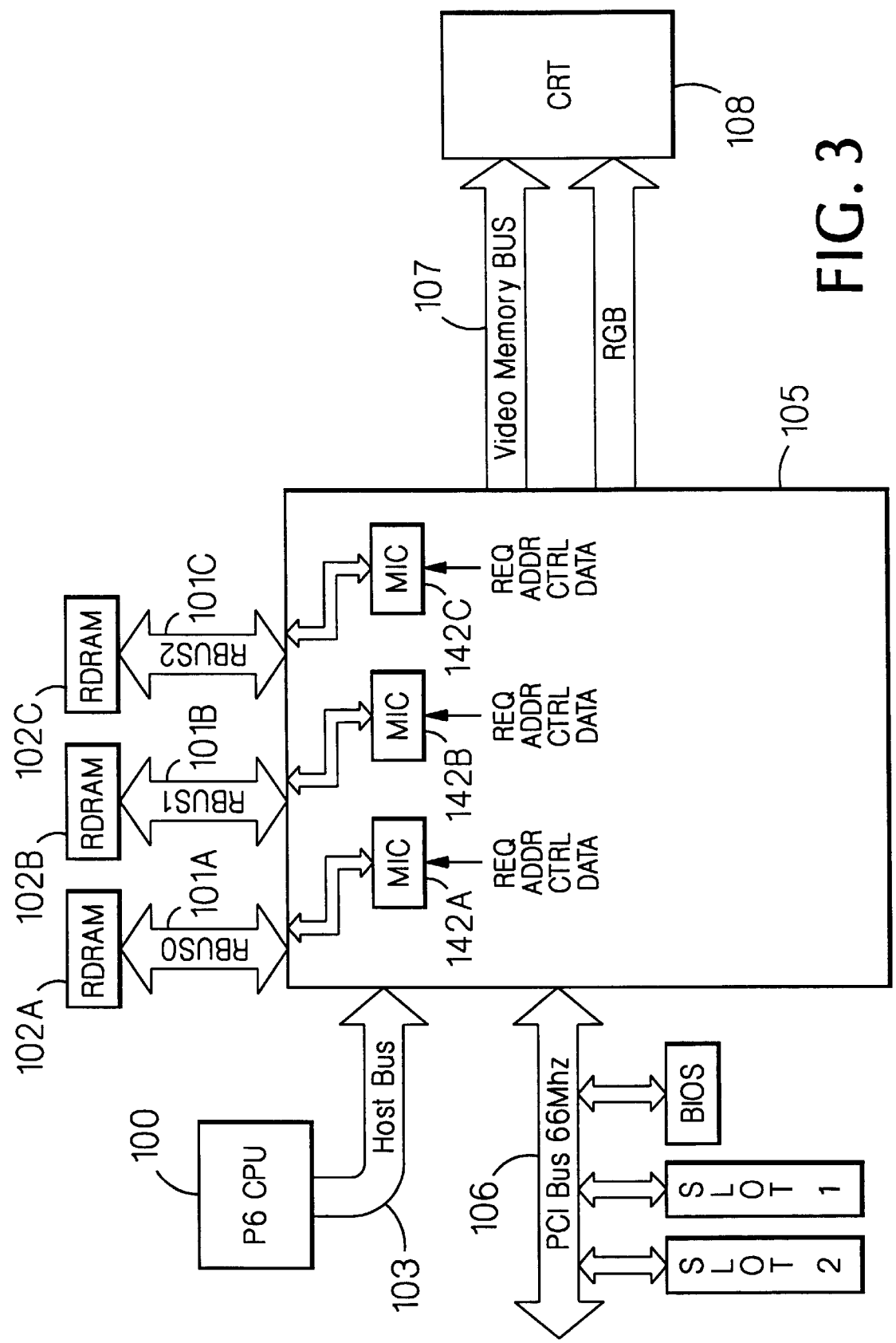
FIG. 3 is a block diagram of a memory system in the computer system.

Referring to FIG. 3, the memory system includes the memory controller 105 connected to three RDRAMs 102A, 102B, and 102C over RDRAM buses 101A, 101B, and 101C, respectively. Each RDRAM channel is associated with a unique address range. The memory controller 105 includes three memory interface control (MIC) blocks 142A, 142B, and 142C corresponding to the three RDRAM buses 101A, 101B, and 101C, respectively. Each MIC block 142 includes its own arbiter, page-hit detection and control logic, and refresh counter and timer. Using multiple RDRAM channels and MIC blocks 142, concurrent access to the main memory 102 by more than one device is allowed. Thus, for example, the CPU 100 can be accessing an address location over one RDRAM bus while the video card 108 can be concurrently accessing another address location over another RDRAM bus, so long as the two address locations are located in two different RDRAM ranges.

Referring again to FIG. 2, as a VUMA device, the video card 108 performs video memory transactions over the video memory bus 107. The video card 108 is coupled to a video display 114 through a connector 112 and includes a CRT controller 118 and map registers 116. The map registers 116 map the linear memory space allocated to the video card 108 to the physical memory space of the main memory 102. A linear address generated by the CRT controller 118 selects one of the map registers 116 to retrieve a physical memory address presented over the video memory bus 107 to perform a main memory access.

A portion (e.g., 1 MB, 2 MB, or 4 MB) of the main memory 102 (hereinafter referred to as "video memory") is allocated to the video card 108. To provide greater flexibility, the video memory is scattered throughout the main memory 102. Thus, the video memory is mixed with the system memory, thereby avoiding the need to allocate a contiguous region of space in main memory to the video memory. In addition, the ability to scatter the memory space of an UMA device throughout the main memory 102 also improves overall system performance, since a more dynamic memory allocation scheme can be implemented.

Other components of the computer system include a SCSI controller 110 (or alternatively, an IDE controller) connected to the PCI bus 106, the SCSI controller 110 being coupled to a mass storage system 124 through a SCSI connector 122. The mass storage system 124 can be a hard disk drive array or a CD-ROM drive. PCI slots 111 also exist on the PCI bus 106 for connection to PCI peripheral cards.

The computer system also includes an Industry Standard Architecture (ISA) expansion bus 128. PCI bus devices communicate with ISA bus devices through a PCI-ISA bridge 126. A non-volatile memory 130 (such as an electrically erasable programmable read-only memory or EEPROM) is connected to the ISA bus 128, as are ISA slots 132 for receiving ISA expansion devices (not shown). In addition, an input/output (I/O) controller 134 is connected to the ISA bus 128. The I/O controller 134 provides interfaces to two serial ports 136 and 138 (which can be connected to a mouse and a keyboard) and a parallel port 140 (which can be connected to a printer).

Software running on the computer system includes applications programs and an operating system, such as the Windows NT operating system. During computer system initialization, basic input/output system (BIOS) code stored in the EEPROM 130 is executed to configure system components, including allocating memory address space, input/output (I/O) address space, and interrupt lines to the devices. Video BIOS code is also stored in the EEPROM 130 (or alternatively, in non-volatile memory in the video card) and is executed to configure the video card 108, including the CRT controller 118 and map registers 116.

Figure 4:
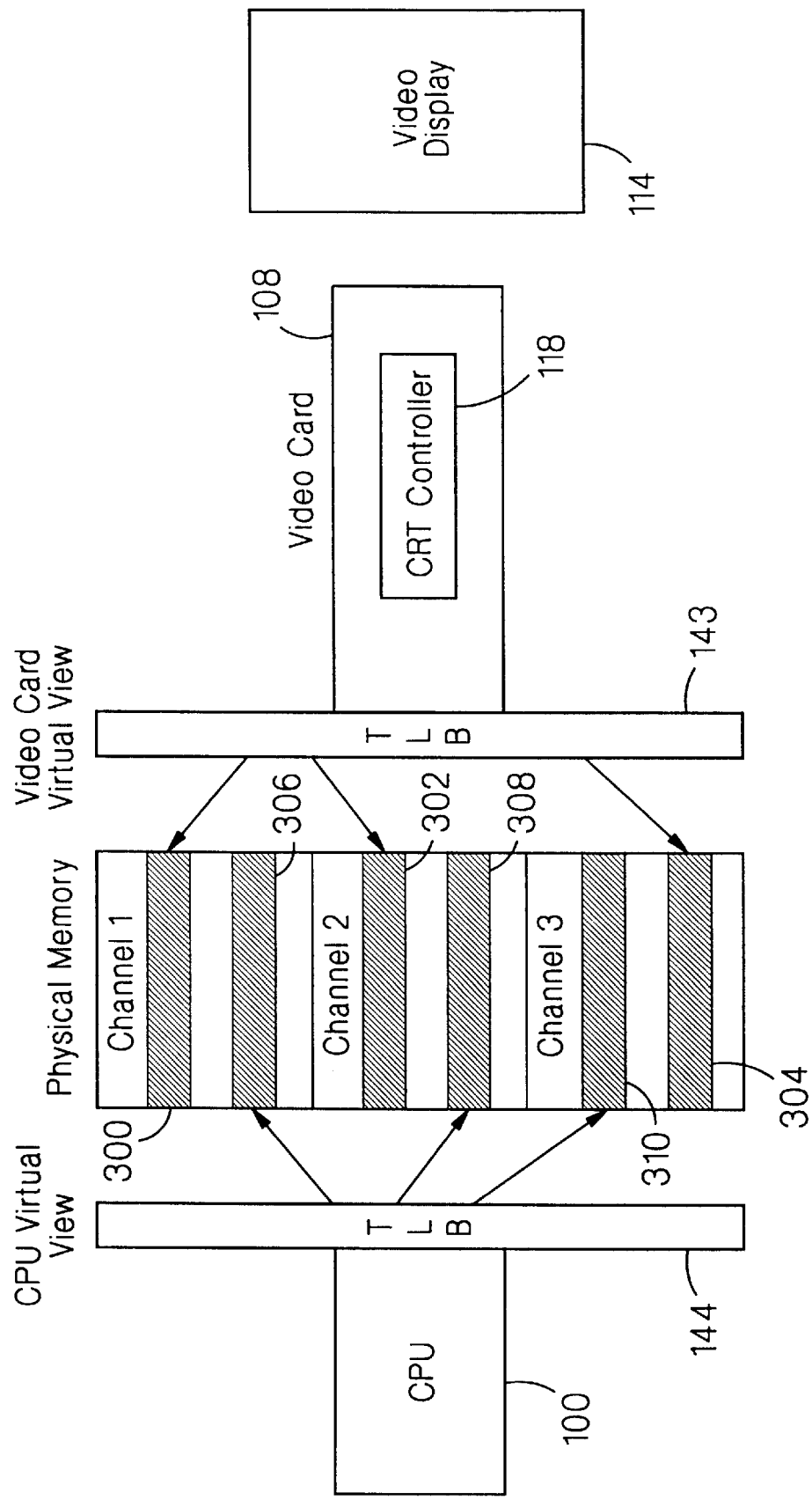
FIG. 4 is a block diagram of the memory addressing scheme in the computer system.

Referring to FIG. 4, the video memory allocated to the video card 108 is mapped to non-adjacent physical page frames in the main memory 102. In the example shown in FIG. 4, the video memory is stored in page frames 300, 302, and 304 in the main memory 102, with the video memory page frames being scattered between page frames 306, 308, and 310 used by the rest of the computer system, including the CPU 100. The only requirement of the memory allocation scheme is that the memory allocated to the video card 108 be used only as video memory. Once physical page frames are allocated to the video memory, those physical page frames are reserved for use as video memory until the memory management process of the operating system changes the physical page allocation.

Additionally, the video memory is distributed throughout RDRAM channels 1, 2, and 3 of the main memory 102. By so distributing the video memory, system performance can further be enhanced by allowing concurrent access to the main memory 102 by the video card 108 over one RDRAM channel while another system device is accessing the main memory over another RDRAM channel.

The video memory space is represented as a linear logical space addressable by the CRT controller 118. The size of the linear logical space can be as large as any conventional video frame buffer (e.g., 1 MB, 2 MB, or 4 MB) or as small as a display line, depending on the requirements of the video system. The map registers 116 in the video card 108 form a translation look-aside buffer (TLB) 143 that maps the linear logical space of the frame buffer to physical page frames in the main memory 102. On the CPU side, a TLB 144 maps the linear logical space seen by the CPU 100 to physical memory space.

Figure 5:
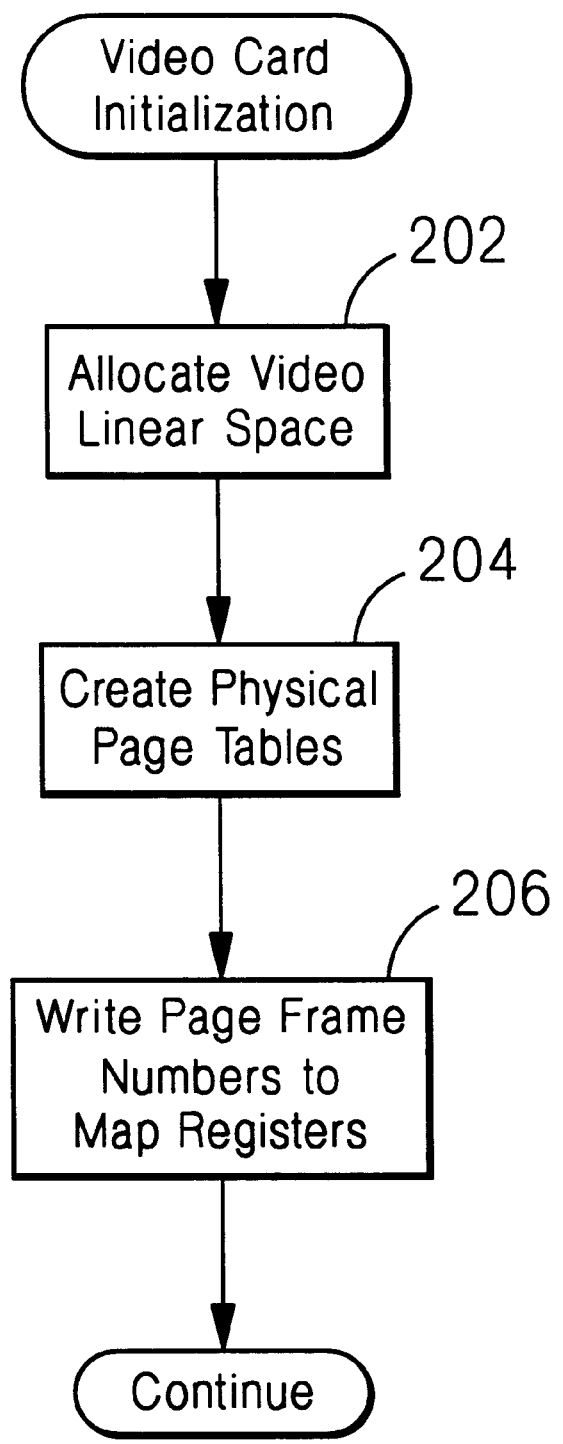
FIG. 5 is a flow diagram of main memory allocation.

Referring to FIG. 5, the linear logical space of the video frame buffer is first allocated at step 202 during initialization of the video device driver in the computer boot-up sequence. The memory allocation is performed by a memory management process in the operating system using standard memory management features, which are specific to the operating system used in the computer, such as Windows NT. The video card 108 includes information storage circuitry accessible by the video device driver to determine the amount of linear address range required by the video card 108. Such information storage circuitry includes non-volatile memory or an application-specific integrated circuit (ASIC) for storing such information as the number of physical memory pages required by the video card 108. Alternatively, the video device driver can retrieve the version ID of the video card 108, and based on the retrieved version ID, determine the required linear address range.

For example, if the video display 114 has dimensions of 1024×768, with 16 bits per pixel, then approximately 1.57 megabytes (MB) of video memory space is required. The actual amount of memory space allocated is a multiple of the page frame size (which is 4 kilobytes or kB in the Windows NT operating system). Once the video device driver determines the linear address range required for the video card 108, it transmits a request to the memory management process of the operating system to allocate the required amount of memory. The request also indicates that the allocation is to be page aligned, i.e., 4-kB aligned. In response, the memory management process returns the address information related to the allocated page frames.

Figure 6:
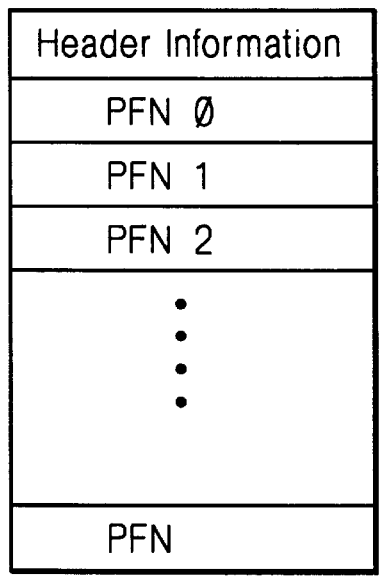
FIG. 6 is a diagram of a memory descriptor list.

Next, the video device driver of the operating system creates at step 204 page tables or lists for mapping video linear address space to actual physical page frames in the main memory 102. If the operating system is the Windows NT operating system, for example, then a memory descriptor list (MDL), shown in FIG. 6, is created at step 204 for the video memory space. An MDL is created for each specific task under Windows NT. Tasks include active application programs. The MDL includes header information followed by a series of physical frame numbers, which correspond to available page frames in the main memory 102. For each particular task, the page frame numbers contained in the MDL represent the page frames in the main memory 102 allocated to the task. The header information includes the starting linear address of the Windows task (e.g., the video memory) and the length of memory allocated to the task. For example, given a 1024×768×16 video display and a memory page size of 4 kB, the length specified in the MDL would be 1.57 MB.

After the MDL for the video memory is created at step 204, the physical frame numbers are written by the video display driver of the operating system at step 206 to the map registers 116 in the video card 108. Once the map registers 116 are programmed, then any linear address generated by the CRT controller 118 will be properly mapped to a physical memory address using the contents of the map registers 116.

Figure 7:
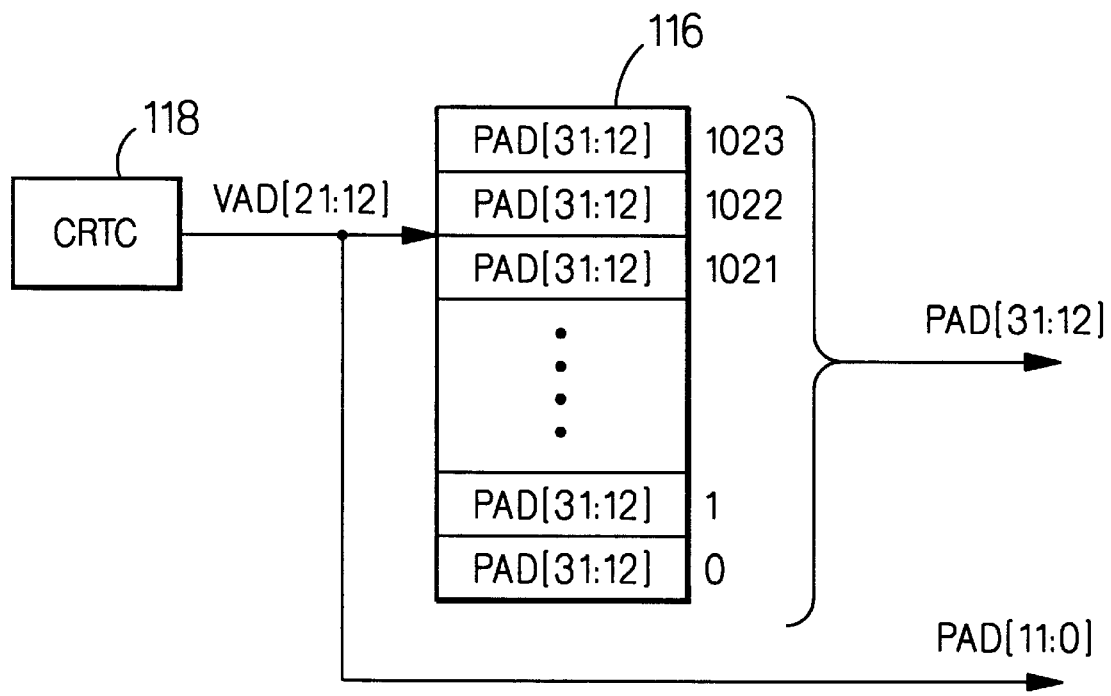
FIG. 7 is a block diagram of portions of a video card.

Referring to FIG. 7, the CRT controller 118 generates linear address signals VAD[21:0]. The 10 most significant address bits, VAD[21:12] are used to select one of 1024 map registers 116 each storing a physical page frame number. Alternatively, if more map registers are required, then the CRT controller 118 can generate additional, more significant address bits. The physical page frame numbers stored in the map registers 116 provide the 20 most significant bits of the physical memory address PAD, i.e., the starting address of a physical page frame. The remaining 12 bits of the linear address, VAD11:0, are connected directly to the 12 least significant bits of the physical memory address PAD to provide the offset into the selected page frame.

Use of the map registers 116 to perform linear-to-physical address mapping provides flexibility in how the video memory space is to be allocated in the physical memory space. The operating system can scatter video memory over different page frames in the main memory 102 if a contiguous region of the main memory 102 is not available for the video memory. Without this ability to scatter video memory, the operating system could have to perform a complete re-allocation of the main memory 102 to create a contiguous region in the main memory for video when the display mode is initialized.

In certain video applications, such as high-end video animation, more than one frame buffer is used by a video system. Thus, for example, if two frame buffers are used in a video animation application, the video data stored in one frame buffer is being displayed while the video animation software running in the computer system writes video data to the other frame buffer. Thus, the computer system can alternately display the contents of the two frame buffers (while the other frame buffer is being updated) to create a superior animation effect on the video display.

Figure 9:
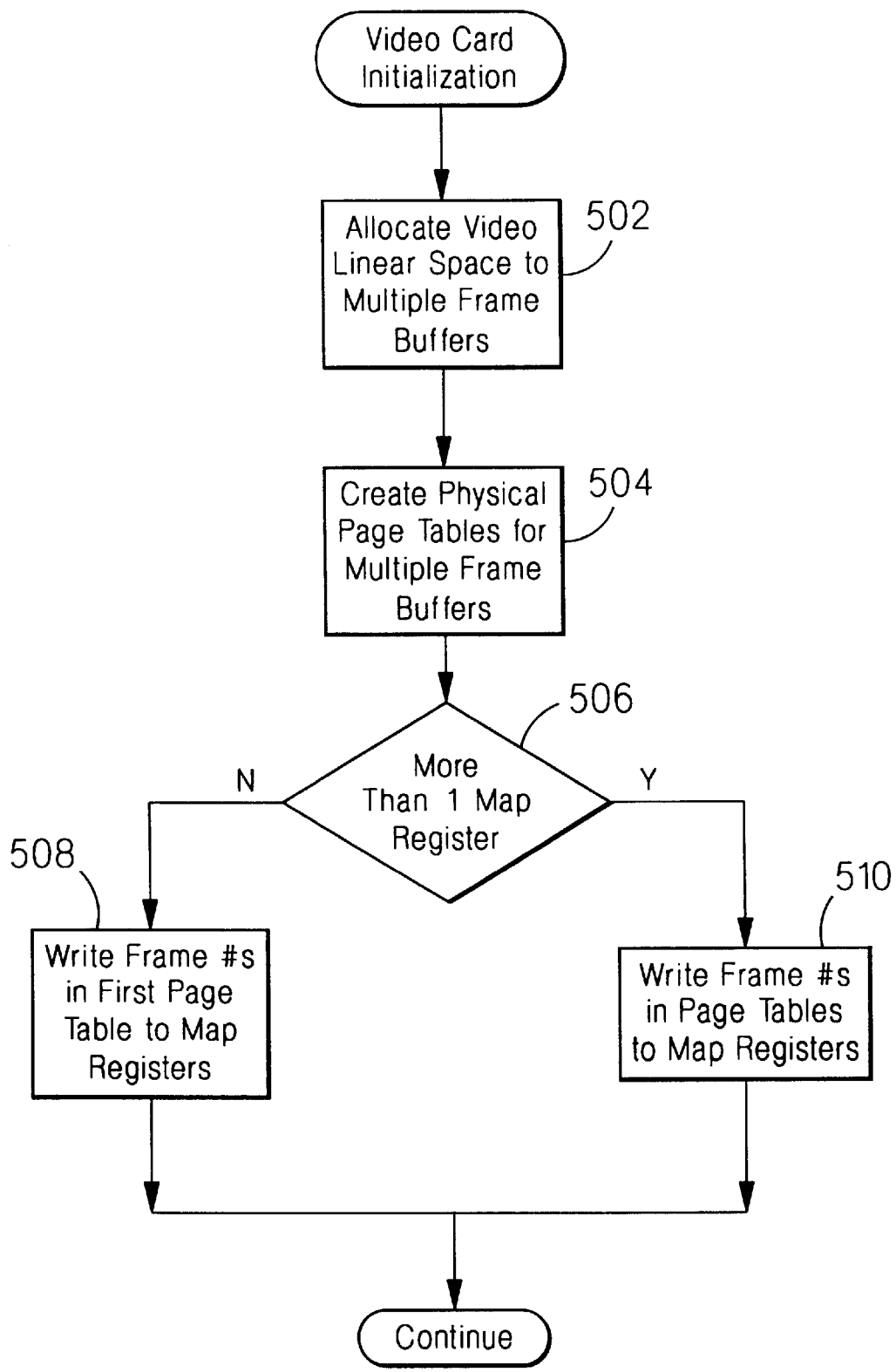
FIG. 9 is a flow diagram of main memory allocation in which multiple frame buffers are to be allocated in main memory for the video card.

Referring to FIG. 9, the two (or more if necessary) frame buffers can be allocated in the main memory 102 using two or more separate MDLs in the video card 108, with one MDL defining the allocated physical page frames for each video frame buffer. Thus, for a multiple-frame buffer video system, the linear address space for each frame buffer is separately allocated at step 502 for each frame buffer, i.e., the total space to be allocated each frame buffer is determined. Next, the separate MDLs are created at step 504.

Next, at step 506, it is determined if one or multiple sets of map registers are used. If only one set of map registers in the video card 108 is used, then the contents of the map registers are alternately filled with the contents of the active one of the multiple MDLs by the animation application software during the animation process. In this scheme, contents of a first MDL is initially written at step 508 to the map register.

If multiple sets of map registers are used in the video card 108, with each map register dedicated to storing the frame numbers of a particular MDL, then the frame numbers of all the MDLs are written at step 510 to corresponding sets of map registers.

Each frame buffer is allocated to distinct page frames in the main memory 102. The frame buffers are scattered throughout the main memory 102 according to memory allocations performed by the memory management process of the operating system.

If multiple sets of map registers are used in the video card 108, then the CRT controller 118 provides a pointer to point to the appropriate set of map registers, i.e., the set corresponding to the frame buffer whose contents are currently being displayed. The pointer is updated by software to point to the frame buffer to be displayed.

If only one set of map registers is used, then the contents of the map registers must be updated with the frame numbers from the MDL of the next frame buffer to be displayed during the video display vertical retrace period. In operation, if two MDLs are used, for example, then the contents of one MDL (as determined by a pointer provided by the video device driver) are first written to the map registers for displaying the contents of the corresponding video display. When the second frame buffer is ready to be displayed, and during the vertical retrace period of the CRT controller 118, the video device driver points to the other MDL and loads its contents into the map registers for displaying the contents of the second frame buffer. This alternating scheme continues throughout the animation process.

Figure 8:
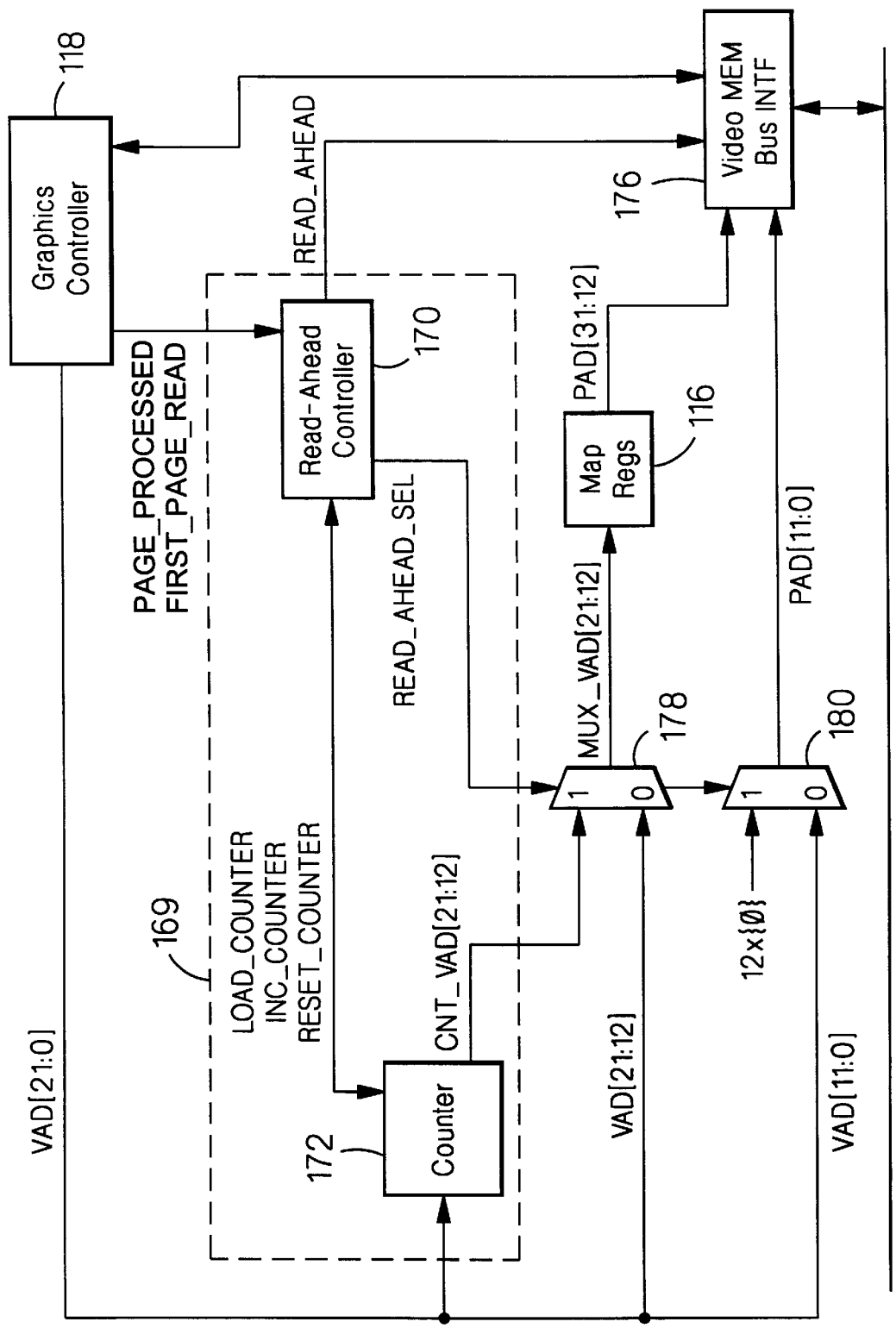
FIG. 8 is a block diagram of read-ahead logic in the video card.

A further feature of the video card 108 is its ability to fetch ahead for video data to improve video performance and efficiency. Generally, video data is processed as a sequential stream of data for display on the computer monitor 114, making the fetch-ahead operation very predictable. Referring to FIG. 8, the video card 108 includes read-ahead logic 169 (which includes a read-ahead controller 170 and a read-ahead counter 172) for opening the next page of video data from the main memory 102 while the CRT controller 118 is working on the current page of video data.

The read-ahead counter 172 receives and stores the first linear address VAD[21:12] from the CRT controller 118 in response to assertion of a signal LOAD_COUNTER by the read-ahead controller 170. The read-ahead controller 170 provides a signal INC_COUNTER to increment the counter 172 (after the initial loading) and a signal RESET_COUNTER to clear the counter 172.

The read-ahead controller 170 controls the states of the signals LOAD_COUNTER and INC_COUNTER based on a signal PAGE_PROCESSED and a signal FIRST_PAGE_READ from the CRT controller 118. Upon assertion of the signal FIRST_PAGE_READ, which indicates that the CRT controller 118 is beginning a new, non-consecutive page read cycle, the read-ahead controller 170 asserts the signal LOAD_COUNTER to load in the value of the address VAD[21:12]. Thereafter, each assertion of the signal PAGE_PROCESSED, asserted by the CRT controller 118 when the CRT controller 118 has reached a "high water mark," e.g., it has processed half or some other predetermined portion of the currently retrieved video data, the readahead controller 170 asserts the signal INC_COUNTER to increment the counter 172. In addition, in response to assertion of the signal PAGE_PROCESSED, the read-ahead controller asserts a signal READ_AHEAD to a video memory bus interface block 176, which generates a hidden page read cycle on the video memory bus 107.

The address for a video memory bus transaction is provided by multiplexers 178 and 180. The multiplexer 178 selects between the linear address VAD[21:12] from the CRT controller 118 (a signal READ_AHEAD_SEL is low) and the address CNT_VAD[21:12] from the counter 172 (READ_AHEAD_SEL is high) for output as address MUX_VAD[21:12]. In similar fashion, the multiplexer selects between address signals VAD[11:0] from the CRT controller 118 and twelve "0s" for output as physical address PAD[11:0]. The address signals MUX_VAD[21:12] select one of the map registers 116 to output the physical address PAD[31:12]. The physical address PAD[31:0] is provided as the address in a video memory bus transaction. In a hidden page read cycle (generated for reading ahead), the physical address is {PAD[31:12 000000000000}.

A hidden page read request on the video memory bus 107 is received by the memory controller 105, which in turn generates a hidden page read cycle to an appropriate one of the RDRAM channels 101. Such a hidden page read cycle does not retrieve data from the main memory 102, but merely serves to keep a page "open" in the memory controller 105.

Each MIC block 142A, 142B, or 142C includes a set of page address registers for storing a row address of the corresponding RDRAM channel 101A, 101B, or 101C. The RDRAMs making up the main memory 102 are addressed using the standard multiplexed row/column addressing scheme for DRAMs, in which a row address selects a page in a DRAM and a column address selects a bit in that page. In DRAM page mode, the row address is maintained constant while only the column addresses are changed, which reduces DRAM access time as row address precharge time can be avoided. Keeping a page open involves storing a row address in one of the page address registers. Thus, if the next memory request is to the same page (i.e., has the same row address), then the page-hit detection and control logic of the MIC block 142 produces a hit indication, and a page mode cycle is generated on the corresponding RDRAM channel 101 to retrieve the requested data.

By keeping the video frame buffer page open in the memory controller 105, the next memory read cycle from the CRT controller 118 to the same page will allow the memory controller to quickly retrieve the page of data using the DRAM's page mode. The read-ahead feature reduces significantly memory access latency for the video card 108.

Other embodiments are within the scope of the following claims. For example, the memory mapping scheme can be extended to other types of peripheral devices which require memory.

What is claimed is:

1. A method of allocating memory space in a main memory of a computer system to a unified memory architecture video device, said computer system including at least one other device operable to access said main memory, wherein the main memory is associated with a physical address space, the method comprising:

determining as part of an initial operating system boot-up of the computer system, a required continuous range of linear addresses according to operating characteristics of the unified memory architecture video device; mapping the continuous range of linear addresses of the unified memory architecture video device to respective ones of multiple non-contiguous pages in the physical address space, said mapped pages in the physical address space defining a video memory frame buffer reserved for said video device; and concurrently accessing one of said non-contiguous pages of said video memory by said unified memory architecture video device and a page of main memory other than said non-contiguous pages of video memory by said at least one other device.

2. The method of claim 1, further comprising:

creating a page table containing page frame numbers corresponding to page frames in the main memory, the page frames associated with said multiple non-contiguous pages being allocated to the unified memory architecture video device.

3. The method of claim 2, wherein said non-contiguous pages each comprises 4 kilobytes of physical memory address space.

4. The method of claim 2, further comprising:

loading the page frame numbers associated with said non-contiguous pages allocated to said video memory into a translation look-aside table for converting said continuous range of linear addresses in the linear address space associated with the video device to respective physical addresses of said non-contiguous pages in the physical address space.

5. The method of claim 2, wherein said non-contiguous pages in the physical address space remain allocated as a frame buffer until the operating system changes such allocation.

6. The method of claim 1, wherein the unified memory architecture video device includes a video controller.

7. The method of claim 1, wherein the video device is operable to control a display and wherein said non-contiguous pages defining said video memory provide a frame buffer for said display.

8. A method of allocating memory space in a main memory of a computer system including a plurality of devices operable to access said main memory, one of said devices comprising a video controller device for controlling operation of a display, said method comprising:

during an operating system initialization process, determining a required range of linear addresses required for the video controller to operate said display according to display resolution parameters of said display;

allocating multiple same-size page frames of the main memory according to the required range of linear addresses for the video device such that said linear addresses correspond to respective ones of multiple, non-contiguous page frames of said main memory, said multiple, non-contiguous page frames providing a video memory display frame buffer accessible by said video controller; and opening concurrently one of said multiple non-contiguous page frames of main memory by said video controller and another page frame of main memory other than said non-contiguous multiple page frames by another one of said devices.

9. A method of allocating and accessing memory space in a main memory in a computer system, for controlling operation of a display by a video device, the method comprising:

programmably allocating first and second ranges of linear addresses required for the video device to operate said display according to selected display resolution characteristics, to physical addresses of individual non-adjacent page frames in the main memory;

allocating respective first and second sets of multiple page frames of the main memory according to the first and second ranges of video device linear addresses such that said linear addresses in said first range correspond to respective ones of multiple, non-contiguous page frames of said main memory to provide a first frame buffer for said display, and said linear addresses in said second range correspond to different respective ones of multiple, non-contiguous page frames of said main memory to provide a second frame buffer for said display, said first and second frame buffers reserved for video memory;

storing page frame numbers in map registers in said video device, wherein the page frame numbers correspond to individual ones of said non-contiguous page frames in the main memory;

operating the video device to generate linear addresses to select map registers containing page frame numbers of said non-contiguous page frames Such that said video device loads said respective frame buffers in an alternating sequence.

10. A computer system, comprising:

a main memory having a physical address space;

a plurality of devices operable to access said main memory;

at least one of said devices comprising a video device allocated an individual range of linear addresses;

said video device including a controller operable under operating system control to map the linear addresses allocated to said video device to respective, non-contiguous page frames in the physical address space, said non-contiguous page frames defining video memory space accessible by said video device;

said video device also including a page table accessible by the controller, the page table containing page frame numbers corresponding to page frames in the main memory physical address space and video device linear addresses in said range of linear addresses mapped to said page fame numbers, said non-contiguous page frames allocated to said video device until said allocation is changed under operating system control; and said at least one device including a read-ahead controller operable to open a next one of said non-contiguous pages of main memory while a current one of said non-contiguous pages is being accessed.

11. The computer system of claim 10, wherein said video device includes a translation look-aside buffer, the controller adapted to load the frame numbers of the page table into the translation look-aside buffer for converting a linear address allocated to said at least one device to a physical address corresponding to one of said non-contiguous page frames.

12. The computer system of claim 10, wherein said video device includes a video card.

13. A computer system, comprising a memory having a physical address space;

a plurality of devices operable to access said main memory;

wherein at least one device is a video device operable to access frame buffer regions of main memory, said video device allocated under operating system control to multiple linear address ranges, the linear addresses in each linear address range mapped to respective, contiguous page frames in the physical address space, such that the non-contiguous page frames mapped to the linear address ranges define respective ones of said frame buffer regions in the main memory; said non-contiguous page frames remaining allocated to said video device until said allocation is changed under operating system control video device further comprising:
   multiple page tables accessible by a controller, each page table containing page frame numbers representing the non-contiguous page frames in the main memory and video device linear addresses in the range of linear addresses mapped to those non-contiguous page frames, and
   said controller selectively operable to generate video device linear addresses in any of said multiple linear address ranges to access the corresponding page table and thereby access the non-contiguous page frame to which a generated video device linear address is mapped.

14. A computer system, comprising:
   a shared main memory having a physical address space;
   a plurality of devices operable to access said main memory, one of said devices comprising a video device operable to control a display, said video device allocated during initialization of an operating system video device driver, a range of linear addresses determined by display resolution parameters data stored by said video device; said video device including a display controller operable to generate linear addresses in the linear address range of the video device;
   said video device including a page table accessible by the display controller, the page table containing programmed entries mapping linear addresses in the linear address range of the video device to page frame numbers corresponding to individual page frames in the shared main memory such that said individual page frames are non-contiguous with one another and provide video memory accessible by the video device;
   said display controller operable to access any of said non-coiitiguous page frames by using the generated linear address associated with that page frame to select the corresponding page table entry; wherein
   said video device is operable to access one of said non-contiguous page frames comprising said video memory concurrently with operation of another device to access a page frame other than one of said non-contiguous page frames.

15. The computer system of claim 14, wherein said another device comprises a CPU.

16. The computer system of claim 14, wherein said non-contiguous page frames are scattered across said physical address space.

17. The computer system of claim 14, including operating system software operable during initialization of a video device driver, to allocate said range of linear addresses to said video device determined according to said display resolution parameters associated with operation of said video device; and wherein said video device driver creates said page tables mapping addresses in said video device linear address range to said non-contiguous page frames.

18. The computer system of claim 14, wherein said non-contiguous pages defining said video memory provide a frame buffer for said display.

19. The computer system of claim 14, wherein said non-contiguous pages in the shared memory space remain allocated as a frame buffer until the operating system changes such allocation.

20. The computer system of claim 14, wherein said non-contiguous page frames are identically sized.

21. The computer system of claim 20, wherein said non-contiguous page frames each comprises 4 kilobytes of main memory.

22. A computer system, comprising:
   a shared main memory having a physical address space, said shared memory comprising
   a plurality of memory channels each accessible over an individual memory channel bus;
   a plurality of devices operable to access said main memory over a channel memory bus;
   one of said devices comprising a video device allocated during operating system initialization of a video driver, a linear address range and allocating a page frame in the physical address space to each linear address in said linear address range, said allocated page frames comprising non-contiguous page frames distributed over the physical address space to define in the shared memory a video frame buffer accessible by said video device until a change in the allocation of said non-contiguous page frames by said operating system;
   a page table correlating addresses in said linear address range to page frame numbers corresponding to said non-contiguous page frames in the shared main memory allocated to the video device;
   a display controller operable to generate linear addresses in said linear address range of the video device to access said page table to select corresponding ones of said non-contiguous page frames for access by the video device; wherein
   said video device is operable to access one of said non-contiguous page frames concurrently with operation of another device to access a page frame other than one of said non-contiguous page frames.

23. The computer system of claim 22, wherein said non-contiguous page frames associated with said video device are allocated to scattered locations in a plurality of said memory channels.

24. The computer system of claim 22, wherein each of said page frames concurrently accessed by said video device and by said another device is accessed over a different memory channel bus.

* * * * *